United States Patent
Chen et al.

(10) Patent No.: US 11,207,593 B1
(45) Date of Patent: Dec. 28, 2021

(54) SCALABLE STATE SYNCHRONIZATION FOR DISTRIBUTED GAME SERVERS

(71) Applicant: Electronic Arts Inc., Redwood City, CA (US)

(72) Inventors: Zebin Chen, Santa Clara, CA (US); Wei Wang, Fremont, CA (US); Harold Henry Chaput, Belmont, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/888,370

(22) Filed: May 29, 2020

(51) Int. Cl.
*A63F 13/35* (2014.01)

(52) U.S. Cl.
CPC .................. *A63F 13/35* (2014.09)

(58) Field of Classification Search
None
See application file for complete search history.

(56) References Cited

U.S. PATENT DOCUMENTS

| | | | | |
|---|---|---|---|---|
| 9,849,389 | B2* | 12/2017 | Gould | A63F 13/77 |
| 9,955,444 | B1* | 4/2018 | Blum | H04L 65/60 |
| 10,080,968 | B2* | 9/2018 | Gould | A63F 13/12 |
| 10,087,937 | B2* | 10/2018 | Seong | F04C 29/0021 |
| 10,322,341 | B2* | 6/2019 | Furumoto | A63F 13/358 |
| 2014/0372376 | A1* | 12/2014 | Smith | G06F 16/184 |
| | | | | 707/624 |

* cited by examiner

*Primary Examiner* — Ronald Laneau
(74) *Attorney, Agent, or Firm* — McDermott Will & Emery LLP (57) ABSTRACT

Various aspects of the subject technology relate to systems, methods, and machine-readable media for game state synchronization. The method includes recording game state changes in a distributed queue. The method also includes updating a global state based on the recorded game state changes in the distributed queue. The method also includes recording a snapshot of the global state, the snapshot comprising an offset from a latest game state change recorded in the distributed queue. The method also includes updating at least one in-sync service of a plurality of in-sync services based on the game state changes and the snapshot of the global state.

20 Claims, 5 Drawing Sheets

SCALABLE STATE SYNCHRONIZATION FOR DISTRIBUTED GAME SERVERS

TECHNICAL FIELD

The present disclosure generally relates to video games, and more particularly to scalable near real-time state synchronization of distributed game servers.

BACKGROUND

A cloud game may utilize many game engine instances and cloud servers to power a single seamless large game world that includes thousands of players. The cloud game may also utilize a large number of complex artificial intelligence (AI) and gameplay systems for various purposes, such as for simulating weather, running an in-game economy, etc. The cloud game may further include rendering of physical objects, which may be run at a higher fidelity than other aspects of the game. In such a setting, it is challenging to reliably synchronize a continuously changing global state so that the players may enjoy a seamless gaming experience.

BRIEF SUMMARY

The subject disclosure provides for systems and methods for scalable near real-time state synchronization of distributed game servers. In an aspect, a distributed state-update queue records state changes occurring in a game. A coordinator service keeps an up-to-date global state and periodically takes snapshots of the game state. During bootstrap, individual services of the game may apply a latest snapshot and then apply state changes that occurred after the latest snapshot (e.g., based on an offset from the state-update queue). As a result, all engines and servers may reliably synchronize their local state with the global state in near real-time.

According to one embodiment of the present disclosure, a computer-implemented method for game state synchronization is provided. The method includes recording game state changes in a distributed queue. The method also includes updating a global state based on the recorded game state changes in the distributed queue. The method also includes recording a snapshot of the global state, the snapshot comprising an offset from a latest game state change recorded in the distributed queue. The method also includes updating at least one in-sync service of a plurality of in-sync services based on the game state changes and the snapshot of the global state.

According to one embodiment of the present disclosure, a system is provided including a processor and a memory comprising instructions stored thereon, which when executed by the processor, causes the processor to perform a method for game state synchronization. The method includes recording game state changes in a distributed queue. The method also includes updating a global state based on the recorded game state changes in the distributed queue. The method also includes recording a snapshot of the global state, the snapshot comprising an offset from a latest game state change recorded in the distributed queue. The method also includes updating at least one in-sync service of a plurality of in-sync services based on the game state changes and the snapshot of the global state.

According to one embodiment of the present disclosure, a non-transitory computer-readable storage medium is provided including instructions (e.g., stored sequences of instructions) that, when executed by a processor, cause the processor to perform operations for game state synchronization. The operations include recording game state changes in a distributed queue. The operations also include updating a global state based on the recorded game state changes in the distributed queue. The operations also include recording a snapshot of the global state, the snapshot comprising an offset from a latest game state change recorded in the distributed queue. The operations also include updating at least one in-sync service of a plurality of in-sync services based on the game state changes and the snapshot of the global state.

According to one embodiment of the present disclosure, a system is provided that includes means for storing instructions, and means for executing the stored instructions that, when executed by the means, cause the means to perform a method for game state synchronization. The method includes recording game state changes in a distributed queue. The method also includes updating a global state based on the recorded game state changes in the distributed queue. The method also includes recording a snapshot of the global state, the snapshot comprising an offset from a latest game state change recorded in the distributed queue. The method also includes updating at least one in-sync service of a plurality of in-sync services based on the game state changes and the snapshot of the global state.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

A cloud game may utilize many game engine instances and cloud servers to power a single seamless large game world that includes thousands of players. The cloud game may also utilize a large number of complex artificial intelligence (AI) and gameplay systems for various purposes, such as for simulating weather, running an in-game economy, etc. The cloud game may further include rendering of physical objects, which may be run at a higher fidelity than other aspects of the game. In such a setting, it is challenging to reliably synchronize a continuously changing global state, including game world data, machine-learning models, etc., to all engines and servers in near real-time so that the players may enjoy a seamless gaming experience.

Aspects of the present disclosure address these issues by providing for systems and methods for scalable near real-time state synchronization of distributed game servers. In an aspect, a distributed state-update queue records state changes occurring in a game. A coordinator service keeps an up-to-date global state and periodically takes snapshots of the game state. During bootstrap, individual services of the game may apply a latest snapshot and then apply state changes that occurred after the latest snapshot (e.g., based on an offset from the state-update queue). As a result, all engines and servers may reliably synchronize their local state with the global state in near real-time.

The disclosed system addresses a problem in traditional video games tied to computer technology, namely, the technical problem of game state synchronization. The disclosed system solves this technical problem by providing a solution also rooted in computer technology, namely, by providing for scalable near real-time state synchronization of distributed game servers.

Figure 1:
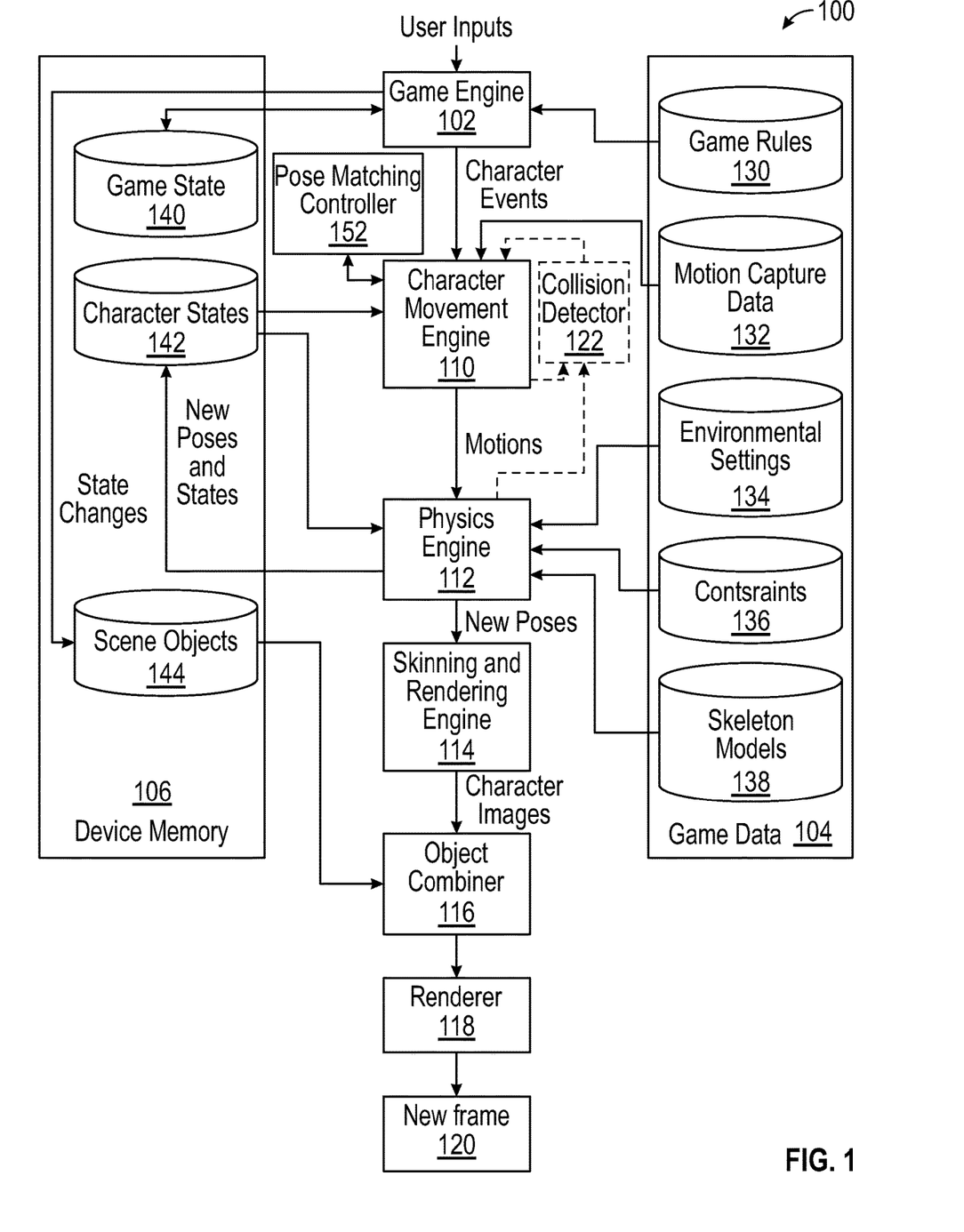
FIG. 1 illustrates implementations of some elements of a video game system in accordance with one or more implementations of the subject technology.

FIG. 1 illustrates implementations of some elements of a video game system 100 in accordance with one or more implementations of the subject technology. In particular, FIG. 1 illustrates implementations of elements involved in execution of gameplay within a game application. The game application may be executed by a user computing device, such as that described below with respect to FIG. 2. The game system 100 may receive user input to control aspects of the game according to game rules 130. Game rules 130 may be specified in instruction form on game media. Examples of game rules 130 include rules for scoring, possible inputs, actions/events, movement in response to inputs, and the like. Other components can control what inputs are accepted and how the game progresses, and other aspects of gameplay. The elements in FIG. 1 illustrate elements used for generating and rendering animation within the game based on various inputs.

As shown in FIG. 1, by system 100, user inputs and game code/data may be used to generate display video. The game system also handles playing the game and presenting corresponding audio output. The description of FIG. 1 is focused on generating frames of display video for the game. A game engine 102 receives the user inputs and determines character events, such as actions, collisions, runs, throws, attacks and other events appropriate for the game.

The character events are conveyed to a character movement engine 110 that determines the appropriate motions the characters should make in response to the events. Further, the character movement engine 110 may generate a character pose that can be passed directly or provided to a skinning and rendering engine 114 or to a physics engine 112 for further processing. This generated character pose may be referred to as the "target pose." The physics engine 112 tracks the target pose by, for example, calculating the torques and forces necessary to make the ragdoll representation of the character follow the target pose. In calculating the torques and forces for making the ragdoll representation of the character follow the target pose, the physics engine 112 may account for or incorporate external forces and collision constraints in its calculations. A muscle system inside or communicating with the physics engine 112 may account for forces that a representation of muscles associated with the character, or its ragdoll representation, may apply in attempting to follow the target pose. By accounting for the representation of the muscles associated with the character, the physics engine 112 can determine how closely the target pose will be followed by the ragdoll. Muscle tensions for the character can be tweaked to follow the target pose loosely or closely. The physics engine 112 may generate the final character pose that may be provided to the skinning and rendering engine 114. The skinning and rendering engine 114 in turn provides character frames to an object combiner 116 to combine animate, inanimate, and background objects into a full scene. The full scene is conveyed to a renderer 118, which generates a new frame 120 therefrom.

Game code/data 104 is shown comprising game rules 130, prerecorded motion capture data 132 (e.g., poses/paths), environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character events. Character movement engine 110 reads in prerecorded poses/paths from a motion capture data repository 132 as well as character states 142. The motion capture data repository 132 can store motion capture clips in the form of marker positions and/or a hierarchy of relative joint orientations. The pose for each frame within the collection of animation clips may be uniquely identified by a corresponding hierarchy of relative joint orientations. An optional collision detector engine 122 can detect collisions generated by the physics engine 112 and alert the game engine to the collisions, which may result in the triggering of specific game events. Further, the detection of collisions may result in a recalculation of the final pose by the physics engine 112.

In some implementations, the character movement engine 110 can work in conjunction with the physics engine 112 to create a procedural animation. In some such implementations, the physics engine 112 may generate a final pose for an object or character that differs from the target pose, in, response to, for example, a collision detected by the collision detector 122. The character pose may be generated on a frame-by-frame basis and can be based at least in part on one or more physics rules implemented by the physics engine 112. For example, the final pose may be based at least in part on the target pose provided by the character movement engine 110 and the impact of a collision force and/or a gravitational value. The character movement engine 110 can use the final pose to identify a motion capture frame included in the motion capture data 132, which may be provided as the target pose for the next frame in the procedural animation. The strength of the muscles determined by the physics engine 112 may be used to determine how closely the new target pose will be followed when generating the subsequent frame. Advantageously, in certain implementations, using the final pose to select a motion capture frame and updating the target pose for the next frame update based on the selected motion capture frame enables more fluid procedural animation compared to pre-existing processes. Further, the use of procedural animation can result in a larger variety of animation within a game while reducing storage space for the game data 104 of a game. In certain implementations, one or more of the game engine 102, the character movement engine 110, the physics engine 112, and the collision detector 122, among other systems may be configured to execute the processes.

As needed, character movement engine 110 may also use other data elements shown, such as skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 110 might also introduce character movements for randomness, personality, and so forth.

In certain implementations, the character movement engine 110 provides a target pose based on, game rules. For example, the game logic may select an, animation to be played, and a current frame of the animation may dictate the target pose. The physics engine 112 can receive the target pose as an input and can calculate the forces and torques to make the ragdoll representation follow the target pose. The strength of the muscles of the ragdoll may determine how closely the target pose is followed by the ragdoll when generating the procedural animation. Further, the physics engine 112 may modify the calculation of the path followed by the ragdoll based at least in part on external forces and/or collision constraints that occur with respect to the character in the video game. Thus, in some cases, even with strong muscles, the target pose may not be reached if, for example, a collision occurs or there is an obstacle in the path of one or more of the character's limbs.

The pose matching controller 152 can identify one or more frames from an animation to display based on how well a character pose from one animation matches a character pose from another animation. For example, the pose matching controller 152 can identify a number of pose features or reference features from a character in a particular animation, or a current frame from the particular animation and determine the difference between the pose features and corresponding pose features from frames of a second animation. In some implementations, a particular frame of an animation is compared to one or more frames from another animation. For example, upon receiving a trigger to change animations, the pose matching controller 152 may compare a current frame and/or a subsequent frame to one or more frames of a new animation to be displayed. The frame from the second animation with pose features that has the smallest difference compared to the pose features of the particular animation may be selected as a start frame when transitioning from the particular animation to the second animation. Advantageously, in certain implementations, the pose matching controller 152 enables animations to appear smoother or more realistic compared to systems that start subsequent animations at the same start frame each time and/or without accounting for the frame of a the current animation when transitioning to a new animation.

The skinning and rendering engine 114 takes into account the surfaces, colors and textures of the body parts of posed characters and renders character images. Object combiner 116 can then combine the character images with inanimate and background objects obtained from scene objects storage 144 to provide a complete scene to renderer 118.

Figure 2:
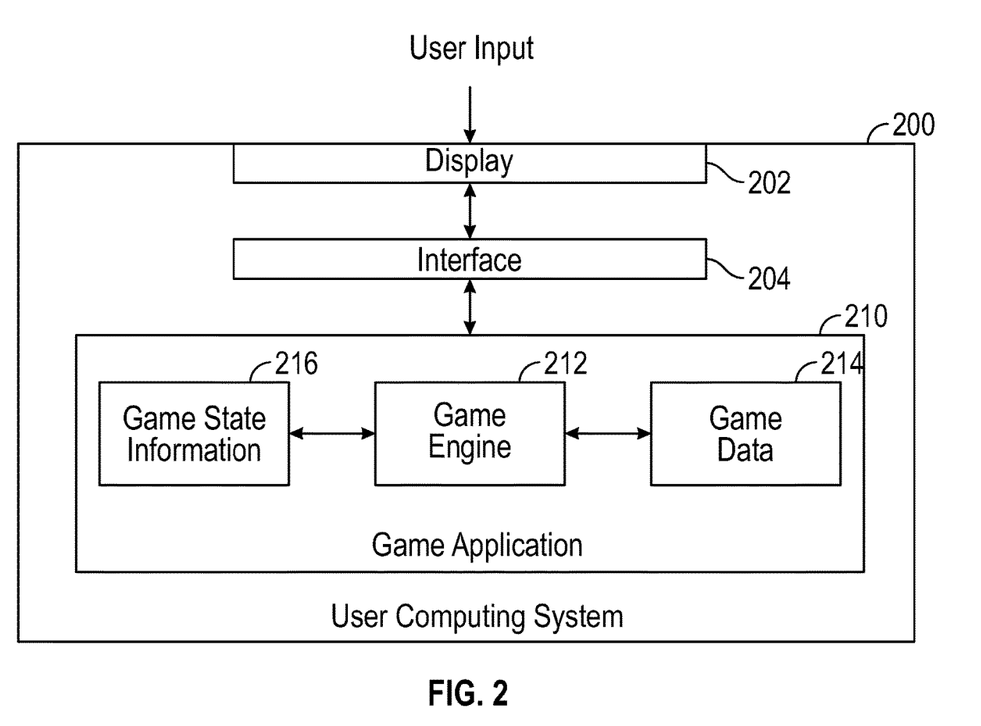
FIG. 2 illustrates an implementation of a user computing system in accordance with one or more implementations of the subject technology.

FIG. 2 illustrates an implementation of a user computing system 200, which may also be referred to as a gaming system, in accordance with one or more implementations of the subject technology. As illustrated, the user computing system 200 may be a single computing device that can include a number of elements. However, in some cases, the user computing system 200 may include multiple devices. For example, the user computing system 200 may include one device that includes that includes a central processing unit and a graphics processing unit, another device that includes a display, and another device that includes an, input mechanism, such as a keyboard or mouse.

The user computing system 200 can be an implementation of a computing system that can execute a game system, such as the game system 100 described with respect to FIG. 1. In the non-limiting example of FIG. 2, the user computing system 200 is a touch-capable computing device capable of receiving input from a user via a display 202. However, the user computing system 200 is not limited as such and may include non-touch capable implementations, which do not include a display 202.

The user computing system 200 includes a display 202 and an interface 204, and is configured to execute a game application 210. For example, the display 202 and the interface 204 may include touchscreen displays and touchscreen interfaces in addition to standard displays and interfaces. This game application may be a video game or an application that executes in conjunction with or in support of the video game, such as a video game execution environment. Further, the game application may include one or more of the features described with respect to the game system 100. Although described as a game application 210, in some implementations the application 210 may be another type of application that may include procedural animations based on motion capture data and/or that may transition between two different animations, such as educational software. While user computing system 200 includes the display 202, it is recognized that a variety of input devices may be used in addition to or in place of the display 202.

The user computing system 200 can include one or more processors, such as central processing units (CPUs), graphics processing units (GPUs), and accelerated processing units (APUs). Further, the user computing system 200 may include one or more data storage elements. In some implementations, the user computing system 200 can be a specialized computing device created for the purpose of executing game applications 210. For example, the user computing system 200 may be a video game console. The game applications 210 executed by the user computing system 200 may be created using a particular application programming interface (API) or compiled into a particular instruction set that may be specific to the user computing system 200. In some implementations, the user computing system 200 may be a general purpose computing device capable of executing game applications 210 and non-game applications. For example, the user computing system 200 may be a laptop with an integrated display or desktop computer with an external display.

A game application 210 can be configured to be executed on the user computing system 200. The game application 210 may also be referred to as a video game, a game, game code and/or a game program. A game application should be understood to include software code that a user computing system 200 can use to provide a game for a user to play. A game application 210 might comprise software code that informs a user computing system 200 of processor instructions to execute, but might also include data used in the playing of the game, such as data relating to constants, images and other data structures. For example, in the illustrated implementation, the game application includes a game engine 212, game data 214, and game state information 216.

The interface 204 or another component of the user computing system 200, such as the operating system, can provide user input, such as touch inputs, to the game application 210. In some implementations, the user computing system 200 may include alternative or additional user input devices, such as a mouse, a keyboard, a camera, a game controller, and the like. A user can interact with the game application 210 via the interface 204 and/or one or more of the alternative or additional user input devices. The game engine 212 can be configured to execute aspects of the operation of the game application 210 within the user computing system 200. Execution of aspects of gameplay within a game application can be based, at least in part, on the user input received, the game data 214, and game state information 216. The game data 214 can include game rules, prerecorded motion capture poses/paths, environmental settings, constraints, animation reference curves, skeleton models, and/or other game application information. Further, the game data 214 may include information that is used to set or adjust the difficulty of the game application 210.

The game engine 212 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 210, game state information 216 can be stored, which can include character states, environment states, scene object storage, and/or other information associated with a state of execution of the game application 210. For example, the game state information 216 can identify the state of the game application at a specific point in time, such as a character position, character action, game level, attributes, and other information contributing to a state of the game application.

The game engine 212 can receive the user inputs and determine in-game events, such as actions, collisions, runs, throws, attacks and other events appropriate for the game application 210. During operation, the game engine 212 can read in game data 214 and game state information 216 in order to determine the appropriate in-game events. In one example, after the game engine 212 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been, described in the context of a character, the process can be applied to any process for processing events and rendering the output for display to a user.

As described above, being able to reliably synchronize global shared state in near real-time across game engines and servers is a critical requirement for many cloud gaming use cases. According to embodiments, each game engine and server may reliably synchronizes its local state with the global state in near real-time independently. Each game engine and server may efficiently update to a most recent snapshot to catch up to the latest global state for capacity expansion and light-weight recovery. According to aspects, the system may utilize a state-update queue to cleanse events and prevent invalid events to flood a game cluster. Accordingly, the system enables a large number of heterogeneous game engines and servers to synchronize to the global state in a simple unified way, as will be described in more detail below.

Figure 3:
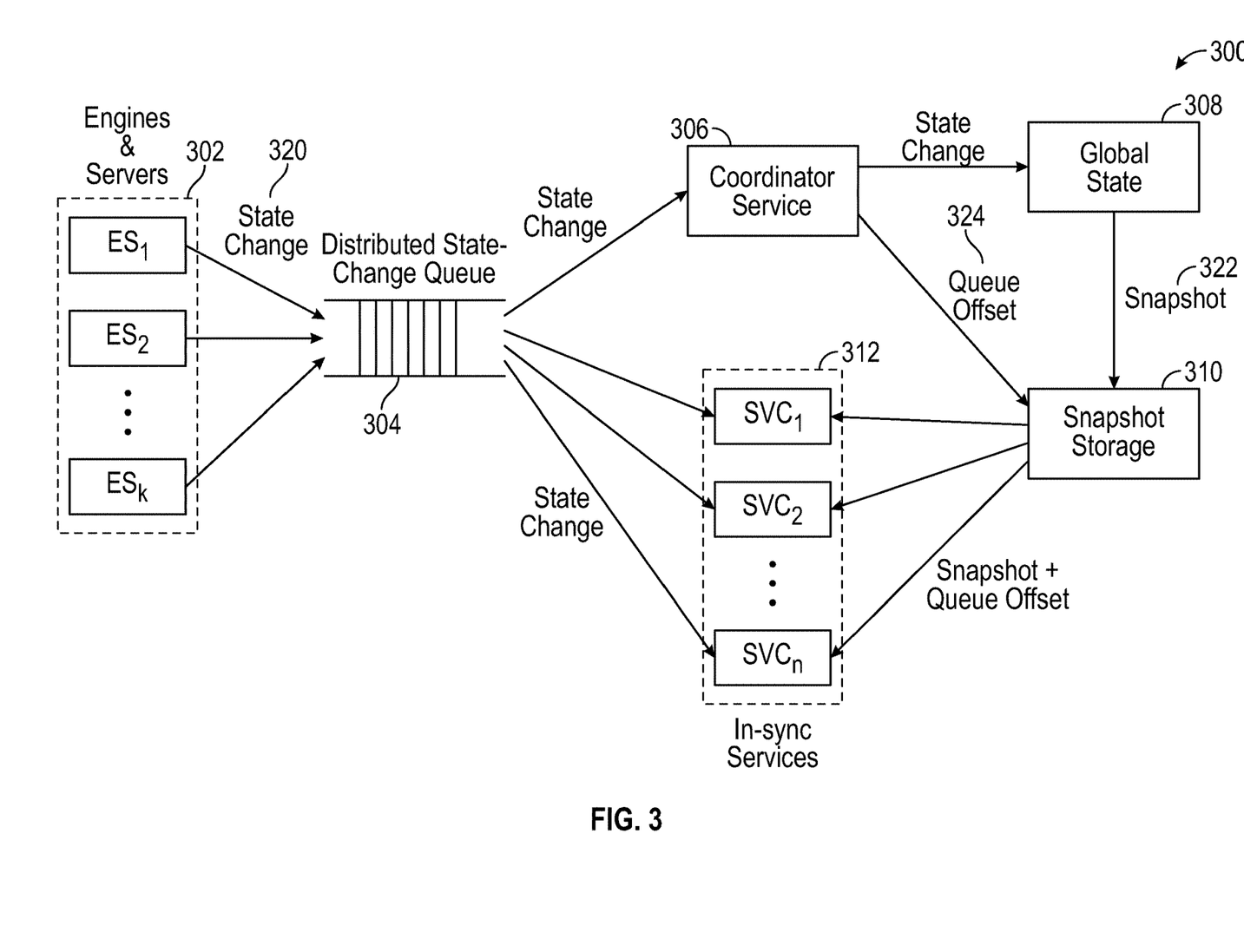
FIG. 3 illustrates an exemplary system for game state synchronization, according to certain aspects of the present disclosure.

FIG. 3 illustrates an exemplary system 300 for game state synchronization, according to certain aspects of the present disclosure. The system 300 may include game engines and servers 302, similar to the above described in FIGS. 1 and 2. The system 300 may further include a state change queue 304 (e.g., a distributed queue), a coordinator service 306, global state storage 308, snapshot storage 310, and in-sync services 312.

According to aspects, the game engines and servers 302 may generate state changes 320 based on player inputs to a video game. For example, the video game may be an online interactive multiplayer game. The state changes 320 may relate to changes in game states from previously generated state changes. For example, the state changes 320 may include data regarding a combination of visual, audio, and/or animation cues that have been modified from a previous game state. Each state change 320 may be recorded in the state change queue 304. For example, the state change queue 304 may record each state change 320 in order of receipt, such that a latest state change is last in the state change queue 304. In this way, state changes 320 may be implemented in chronological order of occurrence.

According to aspects, the state changes 320 may be relayed by the coordinator service 306 to the global state storage 308 as they occur. For example, the coordinator service 306 may be configured to monitor the state change queue 304 for a latest state change. Once recorded in the state change queue 304, the coordinator service 306 may forward the state change 320 to the global state storage 308. The global state storage 308 may implement the state change 320 to update a global state of the game. According to aspects, the global state may relate to an overall global state of the game running on all game engines and servers 302, or the global state may relate to individual game states of individual game engines and servers 302.

In an implementation, the snapshot storage 310 may record a snapshot 322 of a latest global state from the global state storage 308. For example, the snapshot storage 310 may be configured to take a snapshot 322 at even intervals, such as every hour, every day, etc. According to an aspect, the snapshot storage 310 may be configured to take a snapshot 322 at adaptive intervals. For example, the intervals may be based on data volume trend, or heuristic on time intervals. A machine learning algorithm may be utilized to optimize the intervals. It is understood that longer or shorter intervals may be implemented without departing from the scope of the disclosure.

According to aspects, the snapshot storage 310 may also record a queue offset 324 along with the snapshot 322. For example, the snapshot 322 may relate to a latest global state of the game, and the queue offset 324 may relate to a latest state change 320 that was implemented into the global state.

According to aspects, the in-sync services 312 may receive the state changes 320 from the state change queue 304. The state changes 320 may then be applied to each in-sync service 312 as appropriate. For example, each in-sync service 312 may relate to a different function of the game, and so each state change 320 may be applied independently to specific in-sync services 312. According to aspects, the in-sync services 312 may also be configured to receive the snapshot 322 and the queue offset 324 from the snapshot storage 310. For example, the snapshot 322 and the queue offset 324 may be received by the in-sync services 312 as the snapshots 322 are taken. The in-sync services 312 may then utilize the snapshot 322 and queue offset 324 to confirm that the global state reflected in each of the in-sync services 312 is up-to-date without errors. If there are inconsistencies, then the snapshot 322 and queue offset 324 may be utilized to update the in-sync services 312 accordingly to the correct latest global state. Additionally, if connection errors occur, or any other errors that may cause a loss in global state information, the in-sync services 312 may utilize the snapshot 322 and queue offset 324 to quickly catch up to the latest global state without much delay. In this way, the snapshot 322 and the queue offset 324 may be utilized to quickly bootstrap a game to a latest global state in various situations.

It is understood that although each component has been described individually, they all may operate simultaneously and continuously to maintain a latest global state. For example, the state changes 320 may be queued in the state change queue 304 at the same time as other state changes 304 are consumed by the coordinator service 306 and the in-sync services 312 simultaneously. According to aspects, the state change queue 304 may act as a buffer for state changes 320 so that if too many state changes 320 occur at once, they may all be recorded in order of occurrence and implemented based on a least recent state change to a most recent state change.

Figure 4:
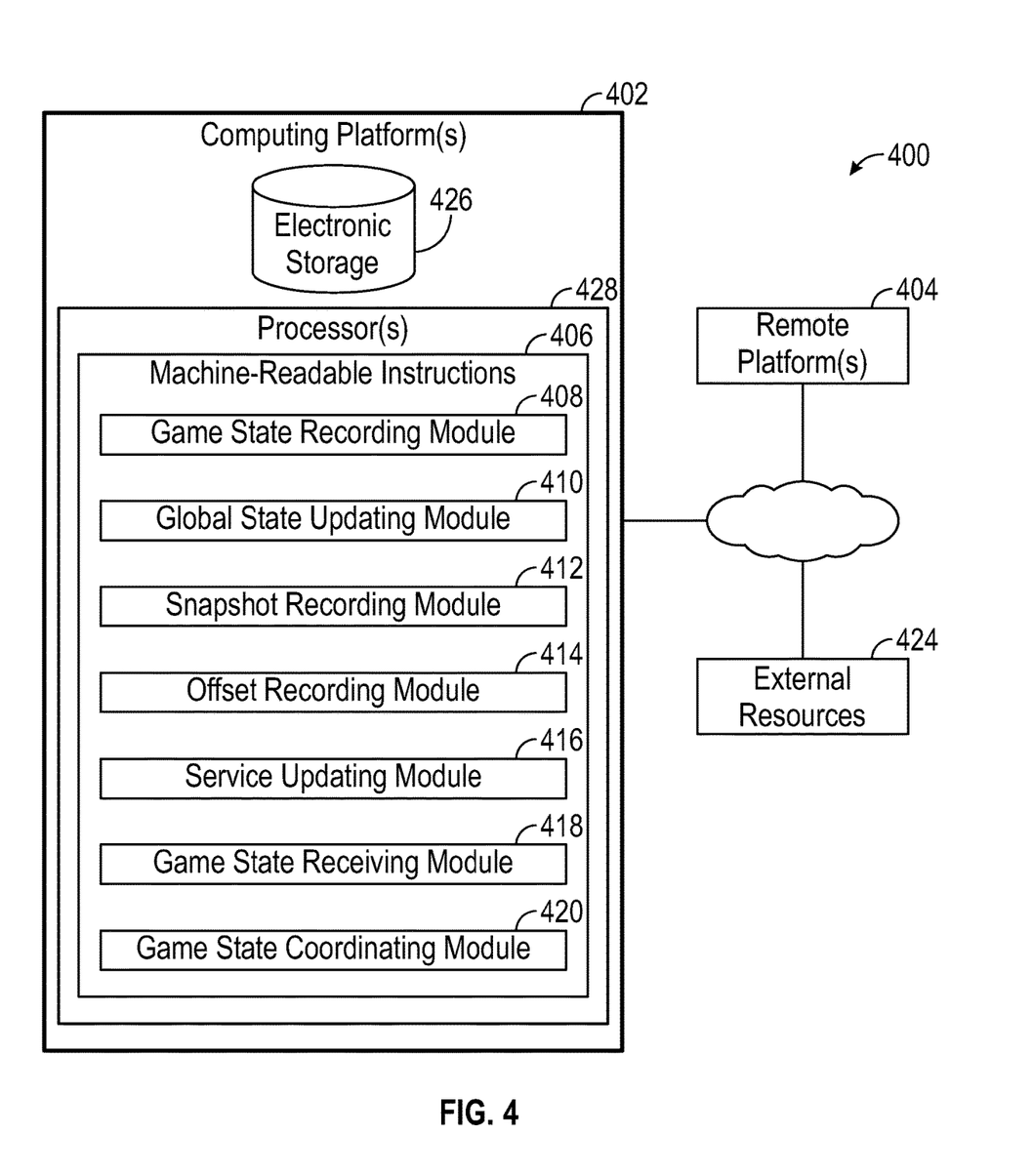
FIG. 4 illustrates an exemplary system configured for game state synchronization, in accordance with one or more implementations

FIG. 4 illustrates an exemplary system 400 configured for game state synchronization, in accordance with one or more implementations. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of game state recording module 408, game state updating module 410, snapshot recording module 412, offset recording module 414, service updating module 416, game state receiving module 418, game state coordinating module 420, and/or other instruction modules.

Game state recording module 408 may be configured to record game state changes in a distributed queue. By way of non-limiting example, the game state changes may include changes to a combination of visual, audio, animation cues, etc.

Global state updating module 410 may be configured to update a global state of the game based on recorded game state changes in the distributed queue.

Snapshot recording module 412 may be configured to record a snapshot of the global state.

Offset recording module 414 may be configured to record an offset from a latest game state change recorded in the distributed queue.

Service updating module 416 may be configured to update at least one in-sync service of a plurality of in-sync services.

Game state receiving module 418 may be configured to receive each game state from a plurality of game engines and servers.

Game state coordinating module 420 may be configured to coordinate implementation of each recorded game state into the global state.

In some implementations, computing platform(s) 402, remote platform(s) 404, and/or external resources 424 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 424 may be operatively linked via some other communication media.

A given remote platform 404 may include one or more processors configured to execute computer program modules. The computer program modules may be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 424 may include sources of information outside of system 400, external entities participating with system 400, and/or other resources. In some implementations, some or all of the functionality attributed herein to external resources 424 may be provided by resources included in system 400.

Computing platform(s) 402 may include electronic storage 426, one or more processors 428, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may comprise non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from computing platform(s) 402, information received from remote platform(s) 404, and/or other information that enables computing platform(s) 402 to function as described herein.

Processor(s) 428 may be configured to provide information processing capabilities in computing platform(s) 402. As such, processor(s) 428 may include one or more of a digital processor, an analog processor, a digital circuit designed to process information, an analog circuit designed to process information, a state machine, and/or other mechanisms for electronically processing information. Although processor(s) 428 is shown in FIG. 4 as a single entity, this is for illustrative purposes only. In some implementations, processor(s) 428 may include a plurality of processing units. These processing units may be physically located within the same device, or processor(s) 428 may represent processing functionality of a plurality of devices operating in coordination. Processor(s) 428 may be configured to execute modules 408, 410, 412, 414, 416, 418, and/or 420, and/or other modules. Processor(s) 428 may be configured to execute modules 408, 410, 412, 414, 416, 418, and/or 420, and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, and/or 420 are illustrated in FIG. 4 as being implemented within a single processing unit, in implementations in which processor(s) 428 includes multiple processing units, one or more of modules 408, 410, 412, 414, 416, 418, and/or 420 may be implemented remotely from the other modules. The description of the functionality provided by the different modules 408, 410, 412, 414, 416, 418, and/or 420 described below is for illustrative purposes, and is not intended to be limiting, as any of modules 408, 410, 412, 414, 416, 418, and/or 420 may provide more or less functionality than is described. For example, one or more of modules 408, 410, 412, 414, 416, 418, and/or 420 may be eliminated, and some or all of its functionality may be provided by other ones of modules 408, 410, 412, 414, 416, 418, and/or 420. As another example, processor(s) 428 may be configured to execute one or more additional modules that may perform some or all of the functionality attributed below to one of modules 408, 410, 412, 414, 416, 418, and/or 420.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
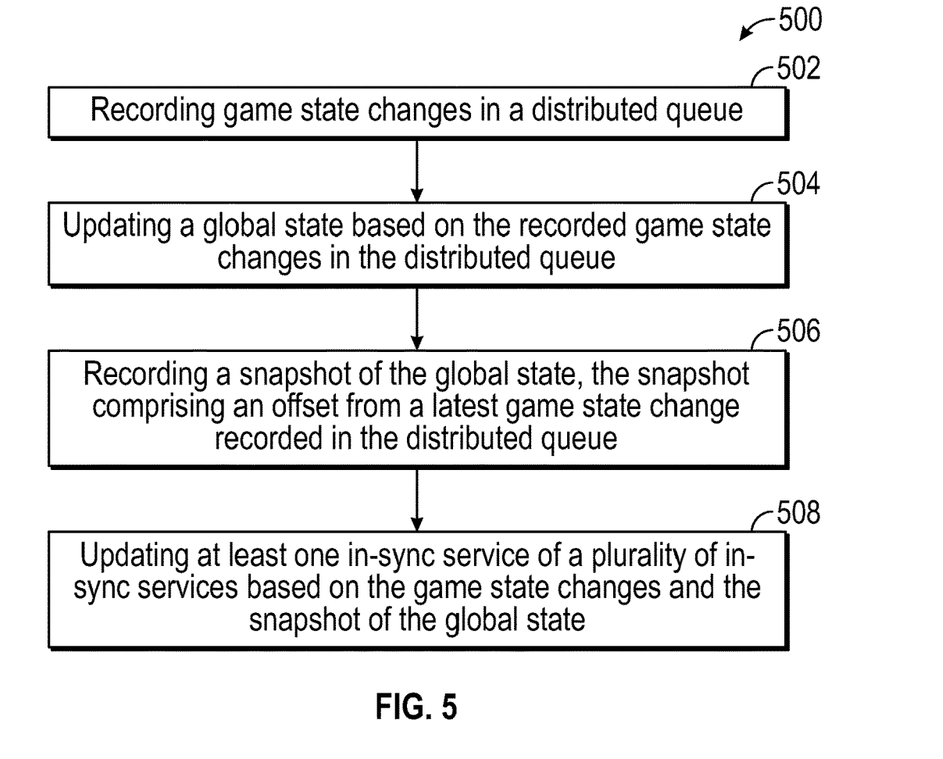
FIG. 5 illustrates an example flow diagram for game state synchronization, according to certain aspects of the disclosure.

FIG. 5 illustrates an example flow diagram (e.g., process 500) for contextual matchmaking, according to certain aspects of the disclosure. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, game state changes are recorded in a distributed queue. At step 504 a global state is updated based on the recorded game state changes in the distributed queue. At step 506, a snapshot of the global state is recorded. For example, the snapshot may include an offset from a latest game state change recorded in the distributed queue. At step 508, at least one in-sync service of a plurality of in-sync services is updated based on the game state changes and the snapshot of the global state.

For example, as described above in relation to FIGS. 1-4, at step 502, game state changes (e.g., state changes 320) are recorded in a distributed queue (e.g., state change queue 304) through a game state recording module 408. For example, the state change may be received from game engines and servers 100, 200, 302. At step 504 a global state (e.g., global state database 308) is updated (e.g., through global state updating module 410) based on the recorded game state changes in the distributed queue. At step 506, a snapshot (e.g., snapshot 322) of the global state is recorded through the snapshot recording module 412. For example, the snapshot may include an offset (e.g., offset 324) from a latest game state change recorded in the distributed queue. At step 508, at least one in-sync (e.g., in-sync services 312) service of a plurality of in-sync services is updated (e.g., through service updating module 416) based on the game state changes and the snapshot of the global state.

According to an aspect, the snapshots are periodically recorded at adaptive intervals. For example, the intervals may be based on data volume trend, or heuristic on time intervals. A machine learning algorithm may be utilized to optimize the intervals. In an implementation, the snapshots may be periodically recorded at even intervals. According to an aspect, players are matched based on results of a matching algorithm.

According to an aspect the process 500 may further include receiving the game state changes from a plurality of game engines of a plurality of game servers.

According to an aspect the process 500 may further include monitoring, through a coordinator service, the distributed queue for game state changes.

According to an aspect, the distributed queue comprises a plurality of game state changes stored in sequence. According to an aspect, each of the in-sync services independently updates based on the offset.

According to aspects, the process 500 may further include storing the global state in a global state database, and storing the snapshot in in a snapshot database.

Figure 6:
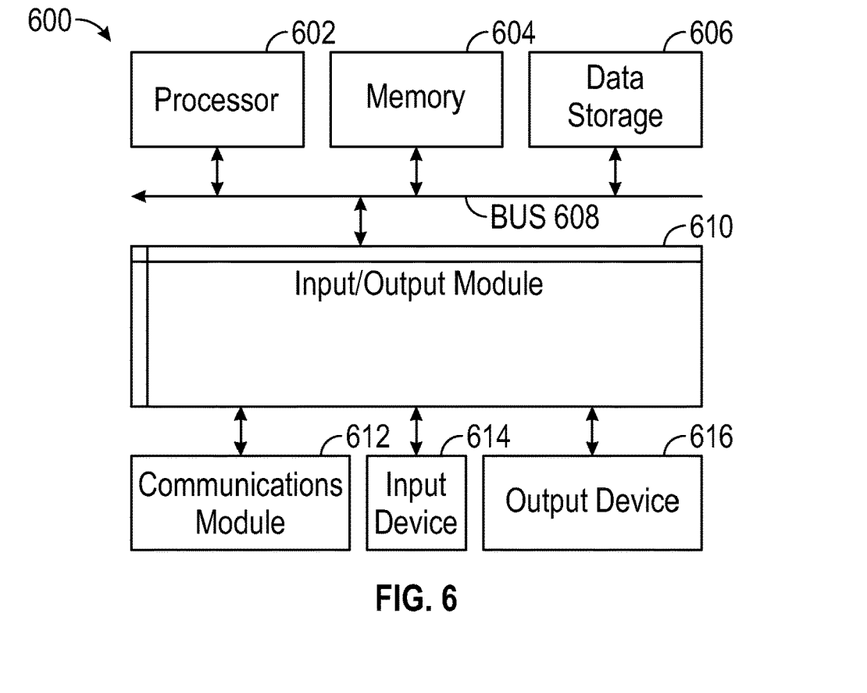
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for game state synchronization, comprising:
  recording game state changes in a distributed queue;
  updating a global state based on the recorded game state changes in the distributed queue;
  recording a snapshot of the global state, the snapshot comprising an offset from a latest game state change recorded in the distributed queue;
  updating at least one in-sync service of a plurality of in-sync services based on the game state changes and the snapshot of the global state; and causing display of an output via a computing device, the output based on the game state changes and the snapshot of the global state.

2. The computer-implemented method of claim 1, wherein snapshots are periodically recorded at adaptive intervals.

3. The computer-implemented method of claim 1, further comprising:
receiving the game state changes from a plurality of game engines of a plurality of game servers.

4. The computer-implemented method of claim 1, further comprising:
monitoring, through a coordinator service, the distributed queue for game state changes.

5. The computer-implemented method of claim 1, wherein the distributed queue comprises a plurality of game state changes stored in sequence.

6. The computer-implemented method of claim 1, wherein each of the in-sync services independently updates based on the offset.

7. The computer-implemented method of claim 1, further comprising:
storing the global state in a global state database; and
storing the snapshot in a snapshot database.

8. A system for game state synchronization, comprising:
a processor; and
a memory comprising instructions stored thereon, which when executed by the processor, causes the processor to perform:
recording game state changes in a distributed queue;
updating a global state based on the recorded game state changes in the distributed queue;
recording a snapshot of the global state, the snapshot comprising an offset from a latest game state change recorded in the distributed queue;
updating at least one in-sync service of a plurality of in-sync services based on the game state changes and the snapshot of the global state; and
causing display of an output based on the game state changes and the snapshot of the global state.

9. The system of claim 8, wherein snapshots are periodically recorded at adaptive intervals.

10. The system of claim 8, further comprising stored sequences of instructions, which when executed by the processor, cause the processor to perform:
receiving the game state changes from a plurality of game engines of a plurality of game servers.

11. The system of claim 8, further comprising stored sequences of instructions, which when executed by the processor, cause the processor to perform:
monitoring, through a coordinator service, the distributed queue for game state changes.

12. The system of claim 8, wherein the distributed queue comprises a plurality of game state changes stored in sequence.

13. The system of claim 8, wherein each of the in-sync services independently updates based on the offset.

14. The system of claim 8, further comprising stored sequences of instructions, which when executed by the processor, cause the processor to perform:
storing the global state in a global state database; and
storing the snapshot in a snapshot database.

15. A non-transitory computer-readable storage medium comprising instructions stored thereon, which when executed by one or more processors, cause the one or more processors to perform operations for game state synchronization, the operations comprising:
recording game state changes in a distributed queue;
updating a global state based on the recorded game state changes in the distributed queue;
recording a snapshot of the global state, the snapshot comprising an offset from a latest game state change recorded in the distributed queue;
updating at least one in-sync service of a plurality of in-sync services based on the game state changes and the snapshot of the global state; and
causing display of an output based on the game state changes and the snapshot of the global state.

16. The non-transitory computer-readable storage medium of claim 15, wherein snapshots are periodically recorded at adaptive intervals.

17. The non-transitory computer-readable storage medium of claim 15, comprising further instructions which, when executed by the one or more processors, cause the one or more processors to perform operations comprising:
receiving the game state changes from a plurality of game engines of a plurality of game servers.

18. The non-transitory computer-readable storage medium of claim 15, comprising further instructions which, when executed by the one or more processors, cause the one or more processors to perform operations comprising:
monitoring, through a coordinator service, the distributed queue for game state changes.

19. The non-transitory computer-readable storage medium of claim 15, wherein the distributed queue comprises a plurality of game state changes stored in sequence.

20. The non-transitory computer-readable storage medium of claim 15, wherein each of the in-sync services independently updates based on the offset.

* * * * *